United States Patent
Shin et al.

(10) Patent No.: US 7,254,496 B2
(45) Date of Patent: Aug. 7, 2007

(54) ESTIMATOR FOR DETERMINING SIGNAL-TO-INTERFERENCE RATIO WITH REDUCED BIAS EFFECT

(75) Inventors: Sung-Hyuk Shin, Northvale, NJ (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/430,645

(22) Filed: May 9, 2006

(65) Prior Publication Data

US 2006/0206290 A1   Sep. 14, 2006

Related U.S. Application Data

(63) Continuation of application No. 11/116,090, filed on Apr. 27, 2005, now Pat. No. 7,069,190, which is a continuation of application No. 10/686,388, filed on Oct. 14, 2003, now Pat. No. 6,957,175.

(60) Provisional application No. 60/425,367, filed on Nov. 8, 2002.

(51) Int. Cl.
*H04B 17/00* (2006.01)

(52) U.S. Cl. .................... 702/60; 702/189; 702/69; 375/227

(58) Field of Classification Search ........... 702/69, 702/60
See application file for complete search history.

(56) References Cited

U.S. PATENT DOCUMENTS

| | | | |
|---|---|---|---|
| 5,623,486 A | 4/1997 | Dohi et al. | 370/342 |
| 6,028,894 A | 2/2000 | Oishi et al. | 375/227 |
| 6,032,026 A | 2/2000 | Seki et al. | 455/63.1 |
| 6,034,952 A | 3/2000 | Dohi et al. | 370/335 |
| 6,292,519 B1 | 9/2001 | Popovic | 375/346 |
| 6,633,553 B1 * | 10/2003 | Hwang | 370/329 |
| 6,885,694 B1 | 4/2005 | He et al. | 375/144 |
| 6,957,175 B2 | 10/2005 | Shin et al. | 702/191 |
| 2003/0142655 A1* | 7/2003 | Higuchi et al. | 370/342 |
| 2003/0223398 A1* | 12/2003 | Haim et al. | 370/342 |

* cited by examiner

Primary Examiner—Hal Wachsman
(74) Attorney, Agent, or Firm—Volpe and Koenig, P.C.

(57) ABSTRACT

A signal-to-interference ratio (SIR) estimator for estimating a SIR of baseband signals which are received and processed by a data demodulator to provide demodulated signals to the SIR estimator. The SIR estimator receives the demodulated symbols from the data demodulator and estimates the average signal power of the demodulated symbols as a function of a median based average power value $m_d$ and a mean based average power value $m_e$ of the demodulated symbols for each quadrant of a quadrature phase shift keying (QPSK) constellation. The function is used to determine a minimum value m between $m_d$ and $m_e$. The SIR estimator estimates the average effective interference power of the demodulated symbols and calculates the SIR by dividing the estimated average signal power of the demodulated symbols by the estimated average effective interference power of the demodulated symbols.

10 Claims, 3 Drawing Sheets

FIG. 4 ature of the present invention pertains.

ESTIMATOR FOR DETERMINING SIGNAL-TO-INTERFERENCE RATIO WITH REDUCED BIAS EFFECT

CROSS REFERENCE TO RELATED APPLICATIONS

This application is a continuation of U.S. patent application Ser. No. 11/116,090 filed Apr. 27, 2005, which issued as U.S. Pat. No. 7,069.190 on Jun. 27, 2006, which is a continuation of U.S. patent application Ser. No. 10/686,388 filed Oct. 14, 2003, which issued as U.S. Pat. No. 6,957,175 on Oct. 18, 2005, which claims the benefit of U.S. Provisional Application No. 60/425,367 filed Nov. 8, 2002, which are incorporated by reference as if fully set forth.

FIELD OF THE INVENTION

The present invention generally relates to a signal-to-interference ratio (SIR) estimator for determining SIR of baseband signals. More particularly, the present invention relates to estimating SIR with reduced bias contribution.

BACKGROUND

A SIR measurement is an important metric of quality performance for digital communication systems. For wireless communication systems such as Third Generation (3G) wireless systems, SIR measurements are used in several link adaptation techniques such as transmit power control and adaptive modulation and coding. Typically, SIR measured at a receiving device is more meaningful than at a transmitting device because SIR measured at a receiving device directly reflects the quality of communicated link signals, especially in the presence of multiple access interference or multipath fading channel.

By definition, a received signal consists of a desired signal and interference. The interference may include other signals and thermal noise at the receiving end. However, the receiving device does not generally have knowledge of either signal power or interference power so that the receiving device needs to perform estimation of both signal and interference power based on received signals using a blind method. A blind method in SIR measurement for a given received signal refers to the signal power and interference power (eventually SIR) obtained only from observation samples of the received signal without any training sequence or any prior knowledge of the desired received signal and interference in the received signal.

There exist several approaches in performing measurement of received SIR. In the prior art, the signal power for a given signal is estimated by averaging the received signal over time, and the interference power is estimated by measuring total power of the received signal and then subtracting the estimated signal power from the total power. The SIR is then determined as the ratio between the estimated signal power and interference power.

The SIR estimation for a given received signal can be performed at different observation points of the receiver structure, such as at the receiver antenna end, at the input to the data demodulator, or at the output from the data demodulator. However, SIR estimates measured at different locations usually have different levels of accuracy because the signal gain or the interference amount at one measurement location is likely to be different from the readings at other locations.

The main problem in measuring the SIR of data signals is that an SIR estimate is likely to deviate from the corresponding true SIR value. Such inaccuracies in SIR estimation arise due to the following two main reasons. First, a signal and its interference cannot be completely separated. Second, desired signals are generally data-modulated, so that the SIR estimation is done in a "blind" way, i.e., without prior knowledge of the data signal. This increases uncertainties in estimating signal power.

In many prior art systems, SIR estimation mainly relies on a mean filter to calculate signal and noise power, resulting in undesirably large bias contribution. Generally, SIR estimation becomes more overestimated as SIR values are smaller, due primarily to a larger bias contribution.

Typically, the k-th demodulated symbol, $y_k$, as an input to a demodulator based SIR estimator, can be represented by:

$$y_k = S_k^d + n_k^e \quad \text{Equation (1)}$$

where $S_k^d$ denotes the k-th demodulated desired QPSK signal and $n_k^e$ denotes the total effective interference (including residual intra-cell interference, inter-cell interference and background noise effects), respectively. S refers to the signal and d is the desired signal. The SIR is then estimated in terms of the average signal power, $P_S$, and the effective interference power, $P_I$, as:

$$SIR = \frac{P_S}{P_I} = \frac{E\{|s_k^d|^2\}}{E\{|n_k^e|^2\}} \quad \text{Equation (2)}$$

By comparing Equation (2) to the SIR definition used in 3GPP, (i.e., RSCP*SF/Interference), neither RSCP nor ISCP is explicitly evaluated for the measurement. In other words, Equation (2) expresses the SIR measurement of a DPCH more explicitly than the 3GPP definition. In addition, since the SIR measurement is carried out on the data part of the received signal, a blind estimation is required due to the unknown transmit data at the receiving device. The function "E{ }" used herein represents an operator to estimate the statistical average (or expected or mean) value of a variable within the brackets "{ }". In the context of probability/statistics or communication systems, it is widely conventional to use E{x} to define the average (expected) value of a (random) variable x.

While the SIR definition used in 3GPP is implicitly independent of the data demodulator type used in the receiving device, the SIR measurement in Equation (2) is implemented at the demodulator output. Thus, the SIR given in Equation (2) is likely to be different for different demodulator types. For example, for a given received signal primarily corrupted by interference, the SIR measured at a conventional matched filter receiver is likely to be smaller than that at an advanced receiver, such as an interference canceller, due to reduced interference effects. Note that the SIR at the demodulator output is the primary determinant of communication link performance. However, the SIR measurement on the data portion of the received signal must deal with the unknown transmit data.

Figure 1:
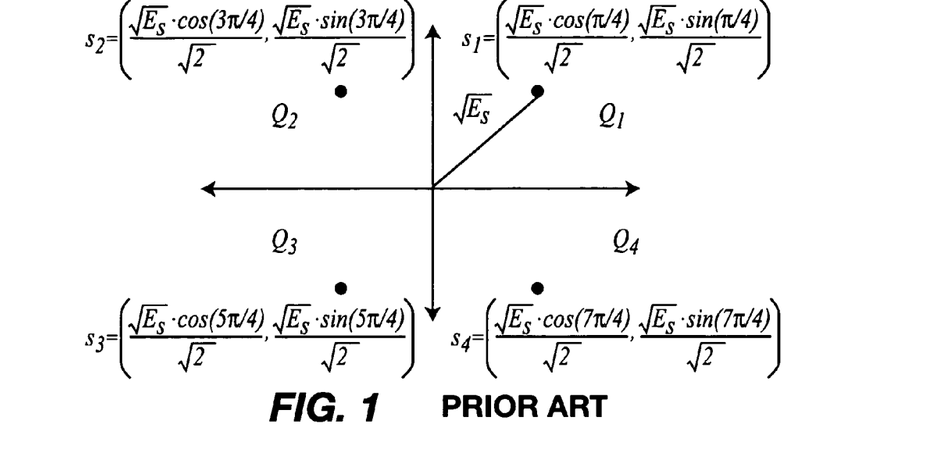
FIG. 1 shows a typical signal constellation for transmitted QPSK symbols.

FIG. 1 depicts a typical transmitted QPSK signal constellation where $E_s$ represents the transmitted QPSK symbol energy. For wireless systems such as 3GPP systems, after spreading the QPSK signal, the resulting spread signal arrives through a radio channel at the receiver. The received signal is then processed by the demodulator, which provides the demodulated symbols, $y_k$ for k=1, 2, ..., $N_{burst}$, where $N_{burst}$ is the number of symbols in the data burst of the received signal.

Figure 2:
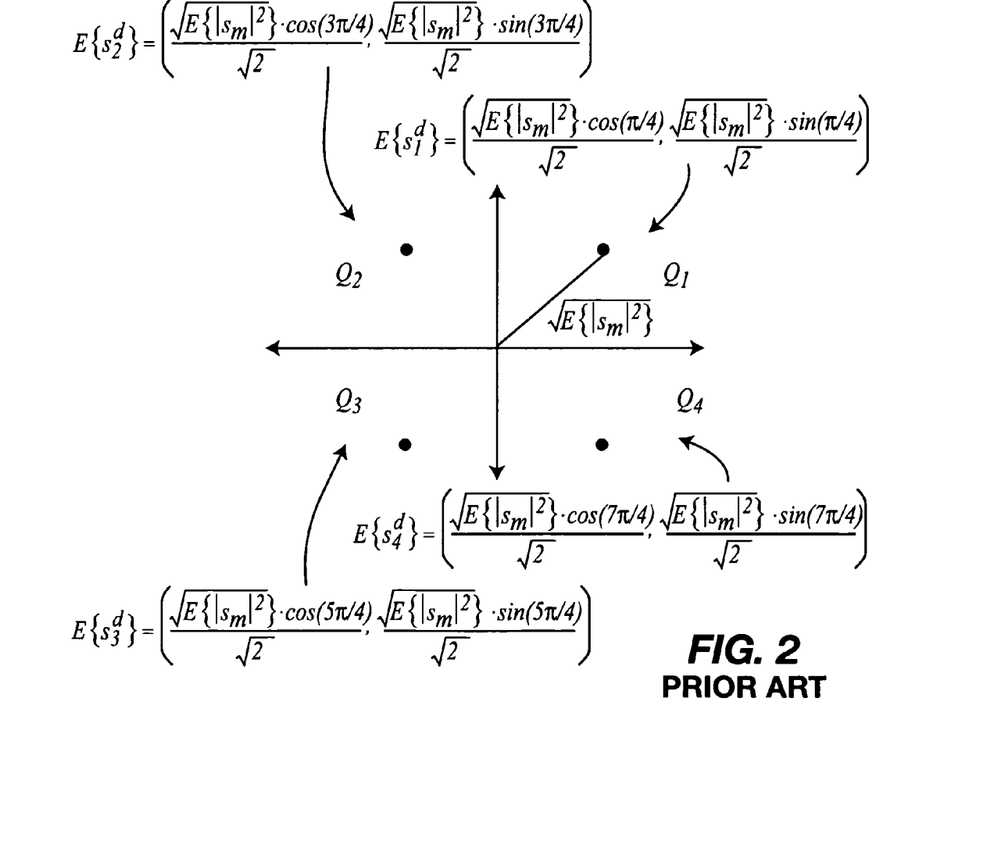
FIG. 2 shows a typical signal constellation for averaged demodulated QPSK symbols.

Taking into account the fading channel impact and demodulator gain, in the absence of the effective interference, the typical signal constellation of soft-valued demodulated symbols can be observed on average, as shown in FIG. 2 where $S_m$ represents the m-th demodulated signal symbol.

Figure 3:
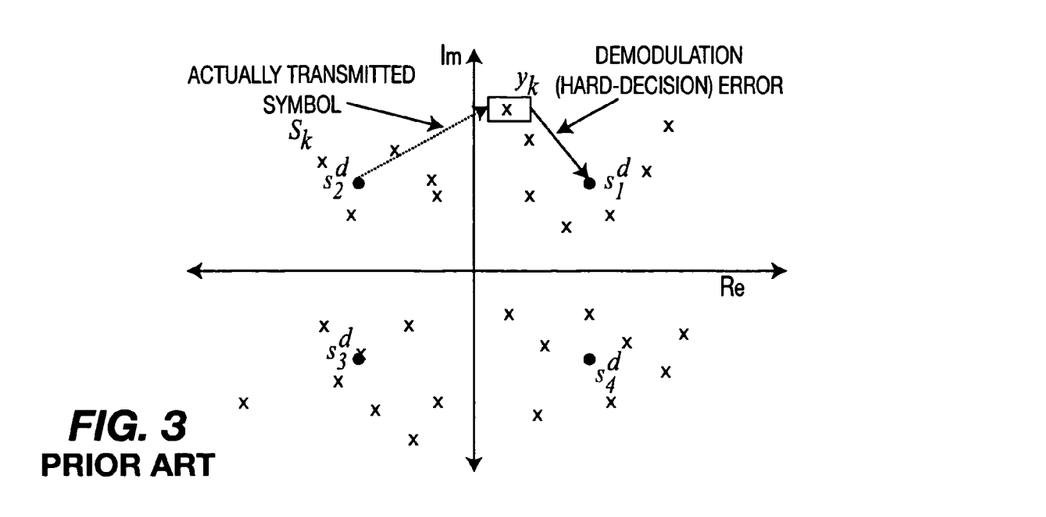
FIG. 3 is a typical space representation of demodulated symbols in the presence of interference.

In the presence of interference, the typical demodulator output symbols can be represented pictorially as in FIG. 3. For a given transmitted symbol, $S_k$, its output symbol may fall into any point in the QPSK constellation, centering around the associated average demodulated symbol, $E\{S_k^d\}$. In this case, the blind-based average power estimation on the demodulator output would be performed. When the decision for each demodulated symbol is made as to which symbol was sent, some decision error may occur most likely due to the effective interference and fading channel. For example, as shown in FIG. 3, even though $S_2^d$ was actually sent for the k-th symbol, the interference may cause the demodulator output symbol, marked by $y_k$, to become closer to $S_1^d$ in the $1^{st}$ quadrant than the actually transmitted symbol, $S_2^d$. As a result, an incorrect decision (i.e., a decision error) on $y_k$ may be made. The decision error is the main source of error that causes the average signal power estimate, and consequently the SIR estimate to be overestimated. In lower SIR range (high raw BER range), the average signal power (or SIR) estimate is likely to be more overestimated.

It is therefore desirable to provide a method of performing SIR estimation without experiencing the disadvantages of prior art methods.

SUMMARY

The present invention is a SIR estimator for determining SIR more accurately than prior art SIR estimators. In an exemplary embodiment, the present invention uses a demodulator output for performing a SIR estimate, whereby the primary determinant of communication link performance appears to be the SIR at the output of the data demodulator. The SIR estimator reduces bias contribution so that the SIR estimate is as close to true SIR as possible.

The present invention preferably uses both a median filter and a mean filter and combines outputs from the median filter and mean filter in SIR estimation. In addition, advantageously, a correction term as a function of the mean and median values is introduced to further mitigate the bias effect.

In accordance with a preferred embodiment of the present invention, an estimate of SIR of baseband signals which are received and processed by a data demodulator to provide demodulated signals to a SIR estimator is performed. The SIR estimator receives the demodulated symbols from the data demodulator and estimates the average signal power of the demodulated symbols as a function of a median based average power value $m_d$ and a mean based average power value $m_e$ of the demodulated symbols for each quadrant of a quadrature phase shift keying (QPSK) constellation. The function is used to determine a minimum value m between $m_d$ and $m_e$. The SIR estimator estimates the average effective interference power of the demodulated symbols and calculates the SIR by dividing the estimated average signal power of the demodulated symbols by the estimated average effective interference power of the demodulated symbols. The SIR estimator reduces bias effects on SIR estimation.

BRIEF DESCRIPTION OF THE DRAWINGS

A more detailed understanding of the invention may be had from the following description of a preferred embodiment, to be understood in conjunction with the accompanying drawing wherein.

ACRONYMS

3GPP: third generation partnership project
BER: block error rate
BPSK: binary phase shift keying
DPCH: dedicated physical channel
ISCP: interference signal code power
MUD: multi-user detection
PSK: phase shift keying
QAM: quadrature amplitude modulation
QPSK: quadrature phase shift keying
RSCP: received signal code power
SF: spreading factor
SIR: signal-to-interference ratio
UE: user equipment

DETAILED DESCRIPTION OF THE PREFERRED EMBODIMENT(S)

A preferred embodiment of the present invention as described below, provides a novel SIR estimation process based on a data demodulator output. The present invention also provides an SIR estimation apparatus. By definition, the term data demodulator output is understood to mean the output provided at the final stage of the considered data demodulator. The data demodulator processes received baseband signals and provides soft-valued estimates of transmitted symbols. The estimated symbols are further processed by other receiver functions, such as a channel decoder, in order for the receiving device to extract the transmitted data information.

In the context of a 3GPP system, the demodulator may be configured as a multi-user detection (MUD) receiver or a single-user detection (SUD) receiver, such as a matched filter, a Rake receiver and an equalizer. Even though BPSK (binary phase shift keying) and QPSK (quadrature phase shift keying) modulation schemes are referenced in the preferred embodiments, the present invention may be applied to higher order modulations like 8-PSK and 16-QAM (quadrature amplitude modulation).

The present invention estimates average signal power such that the bias effect is mitigated. When QPSK symbols are transmitted, the average signal power of the k-th demodulated signal, $y_k$, may be estimated as follows:

$$E\{|S_k^d|^2\} \approx \left|\frac{1}{4}\sum_{Q_i}|E\{y_k|y_k \in Q_i\}\right|^2 \quad \text{Equation (3)}$$

$$= \left|\frac{1}{4}\sum_{Q_i}\left|\frac{1}{N_{Q_i}}\sum_{k=1}^{N_{Q_i}}y_k(Q_i)\right|\right|^2$$

$$= \left|\frac{1}{4}\sum_{Q_i}|E\{y_k(Q_i)\}|\right|^2$$

where $S_k^d$ is the k-th demodulated desired QPSK signal, $Q_i$ represents the $i^{th}$ quadrant in the QPSK signal constellation; $N_{Q_i}$ represents the number of the demodulator output symbols belonging to the $i^{th}$ quadrant region after making blind based symbol decisions respectively; and $y_k(Q_i)$ is the k-th output symbol, which is in the $i^{th}$ quadrant.

Equation (3) is utilized to determine the mean of the demodulator output symbols in each quadrant of the QPSK constellation. Secondly, Equation (3) determines the average signal power based on the magnitude of the mean signal points in the individual quadrant. This two-step averaging (mean) mechanism may provide a good estimate for the average signal power in relatively high SIR range (equivalently low symbol error rate). However, as mentioned previously, as the actual SIR gets lower, the average signal power values become biased (overestimated) due to more symbol decision errors, leading to overestimated SIR values (see Equation (2)) as well. To reduce the bias effect in the signal power estimation, another statistical parameter, called "median" (the middle of a distribution), is utilized as will be described in detail hereinafter.

The mean and median are symmetrically distributed. Accordingly, with high SIR values, the mean and median of the demodulator output symbols located in each quadrant are almost identical since the interference experienced in the individual quadrant can be approximated to be normally distributed in a high SIR range.

The median is less sensitive to extreme sample values than the mean. This characteristic of the median may make the median based average power closer to the true average power than the mean based average power especially for a highly skewed distribution such as a Log-normal distribution, or as the SIR gets lower and the distribution of the demodulator output samples in each quadrant approaches the skewed distribution.

The standard deviation of the median for large samples with normal distribution is larger than that of the mean. The median is thus more subject to sampling fluctuations. Thus, when the number of random samples with normal distribution is large, the standard deviation of the median is generally greater than that of the mean.

Taking into account the above statistical properties of the median and mean, the present invention determines an average signal power estimate $E\{\ \}$ of the symbols/bits as a function of the minimum value between the median value and mean value as follows:

$$E\{|S_k^d|^2\} = \left|\min\left(\begin{array}{c}\left[\frac{1}{4}\cdot\sum_{i=1}^{4}|\text{median}(y_k(Q_i))|\right],\\ \left[\frac{1}{4}\cdot\sum_{i=1}^{4}|\text{mean}(y_k(Q_i))|\right]\end{array}\right)\right|^2 \quad \text{Equation (4)}$$

where $S_k^d$ is the k-th demodulated desired QPSK signal, $y_k$ is the k-th demodulated symbol, $Q_i$ denotes the quadrants i of the QPSK constellation, median $(y_k(Q_i))$ and mean $(y_k(Q_i))$ denote the median and mean values, respectively, of the symbols/bits in the i-th quadrant $Q_i$, and min([median value], [mean value]) represents a minimum value function for determining a minimum value between the median and mean values. $y_k(Q_i)$ is a complex valued symbol, median $(y_k(Q_i))$=median(real$(y_k(Q_i))$)+j·median(imag$(y_k(Q_i))$), and similarly mean$(y_k(Q_i))$=mean(real$(y_k(Q_i))$)+j·mean(imag$(y_k(Q_i))$). That is, the average signal power is equal to the magnitude squared of the minimum of the median absolute and mean absolute averaged over all quadrants. In Equation (4), the main reason for finding the minimum value between the median value and mean value of the demodulated symbols is described below. The main reason for using the minimum value between the median and mean value is to reduce the bias effect. It should be noted that the SIR value estimated according to the present invention can not be greater than the SIR derived by the mean value only, because the minimum value between the median and mean value is the smallest one of the median value and the mean value.

The selection of the median value as the minimum mitigates the bias effect on estimating average signal power especially in the low SIR range. On the other hand, selection of the mean value as the minimum compensates for the drawback in median calculation, such as being subject to the sampling fluctuations. Thus, by effectively combining the median and mean values of the demodulator output symbols for each quadrant of the QPSK constellation, the estimation performance of the average signal power is substantially improved. Even though the minimum value between the median value and the mean value is referenced in the preferred embodiments, other combined values from the median and mean may be used to determine the average signal power estimate. For example, a weighted (combined) method is as follows:

$$E\{|S_k^d|^2\} = \left|\alpha\cdot\left[\frac{1}{4}\cdot\sum_{i=1}^{4}|\text{median}(y_k(Q_i))|\right] + (1-\alpha)\cdot\left[\frac{1}{4}\cdot\sum_{i=1}^{4}|\text{mean}(y_k(Q_i))|\right]\right|^2 \quad \text{Equation (5)}$$

where $0<=\alpha<=1$.

Next, the averaged effective interference power based on Equation (4) is estimated. From Equations (1) and (4), the averaged effective interference power may be expressed by:

$$E\{|n_k^e|^2\} = \frac{1}{4}\left\{\frac{\sum_{i=1}^{4}\frac{1}{N_{Q_i}}}{\sum_{k=1}^{N_{Q_i}}\left|y_k(Q_i) - q_i\cdot\sqrt{E\{|S_k^d|^2\}}\right|^2}\right\} \quad \text{Equation (6)}$$

where $n_k^e$ denotes the total effective interference, $N_{Q_i}$ represents the number of the demodulator output symbols belonging to the $i^{th}$ quadrant region after making blind based symbol decisions respectively, $y_k(Q_i)$ is the k-th output symbol, which is in the $i^{th}$ quadrant, $\sqrt{E\{|S_k^d|^2\}}$ represents the average signal amplitude estimate and $q_i$, for i=1, 2, 3 and 4, respectively, represents the i-th QPSK constellation signal point denoted as follows:

$$q_1 = \frac{1+j}{\sqrt{2}}, q_2 = \frac{-1+j}{\sqrt{2}}, q_3 = \frac{-1-j}{\sqrt{2}}, q_4 = \frac{1-j}{\sqrt{2}},$$

where j is an imaginary number, (e.g. $j=\sqrt{-1}$).

SIR estimation must now be performed. From Equations (4) and (6), the demodulator based SIR estimate can be expressed by:

$$SIR = \frac{E\{|s_k^d|^2\}}{E\{|n_k^e|^2\}}$$

Equation (7)

$$= \frac{\left\| \min\left( \begin{bmatrix} \frac{1}{4} \cdot \sum_{i=1}^{4} |\text{median}(y_k(Q_i))| \end{bmatrix}, \begin{bmatrix} \frac{1}{4} \cdot \sum_{i=1}^{4} |\text{mean}(y_k(Q_i))| \end{bmatrix} \right) \right\|^2}{\frac{1}{4} \cdot \left\{ \sum_{i=1}^{4} \frac{1}{N_{Q_i}} \cdot \sum_{k=1}^{N_{Q_i}} \left| y_k(Q_i) - q_i \cdot \sqrt{E\{|s_k^d|^2\}} \right|^2 \right\}}$$

This SIR estimation has been validated via link-level simulations, which show that the performance of the SIR estimation based on Equation (7) is acceptable in reasonable operating SIR range. But in the low SIR range, (for instance, from 5 dB to 0 dB or below), the biased effect due to symbol errors still appears in the SIR estimation so that it causes the estimated SIR to deviate from true SIR. The minimum value can not completely eliminate the bias effect especially in the low SIR range, because there may be some symbol decision errors in determining the associated blindly based symbol decision. In this case, some correction on Equation (7) is required to meet the current standards requirement of 3GPP Working Group 4 (WG4). The present invention (including the correction term) exceeds this requirement.

By a heuristic approach through Monte-Carlo simulations, a correction term is introduced in the numerator (signal power term) of the above equation as a function of the offset between the calculated median and mean values, as follows:

$$SIR = \frac{\left\| \min\left( \begin{bmatrix} \frac{1}{4} \cdot \sum_{i=1}^{4} |\text{median}(y_k(Q_i))| \end{bmatrix}, \begin{bmatrix} \frac{1}{4} \cdot \sum_{i=1}^{4} |\text{mean}(y_k(Q_i))| \end{bmatrix} \right) \right\|^2 - C}{\frac{1}{4} \cdot \left\{ \sum_{i=1}^{4} \frac{1}{N_{Q_i}} \cdot \sum_{k=1}^{N_{Q_i}} \left| \frac{y_k(Q_i) -}{q_i \cdot \sqrt{E\{|s_k^d|^2\}}} \right|^2 \right\}}$$

Equation (8)

where $$C = \left\| \begin{bmatrix} \frac{1}{4} \cdot \sum_{i=1}^{4} |\text{median}(y_k(Q_i))| \end{bmatrix} - \begin{bmatrix} \frac{1}{4} \cdot \sum_{i=1}^{4} |\text{mean}(y_k(Q_i))| \end{bmatrix} \right\|^2.$$

The basis for using such a correction term is that in a high SIR range, the median value and mean value in the correction term are mostly likely close to each other. Therefore, the correction term can be negligible when in the range it is not needed, (since without it the estimated SIR is already within the accuracy requirement). However, as the actual SIR gets lower, the skewed distribution due to symbol error effect of the demodulator output samples may drive the correction term increasingly, since the difference between the corresponding median and mean values may be gradually increased. At the same time, as the estimated signal power (eventually SIR) gets overestimated (biased), the correction term may help to reduce the biased effect in the SIR estimation.

Although the SIR measurement method described hereinbefore was derived under the assumption that the demodulator output is the complex valued QPSK symbols sequence, for a practical MUD implementation, the MUD provides real valued data bits sequences with each pair of two consecutive data bits, which can map to a complex valued symbol such as QPSK modulation in a transmitter.

Figure 4:
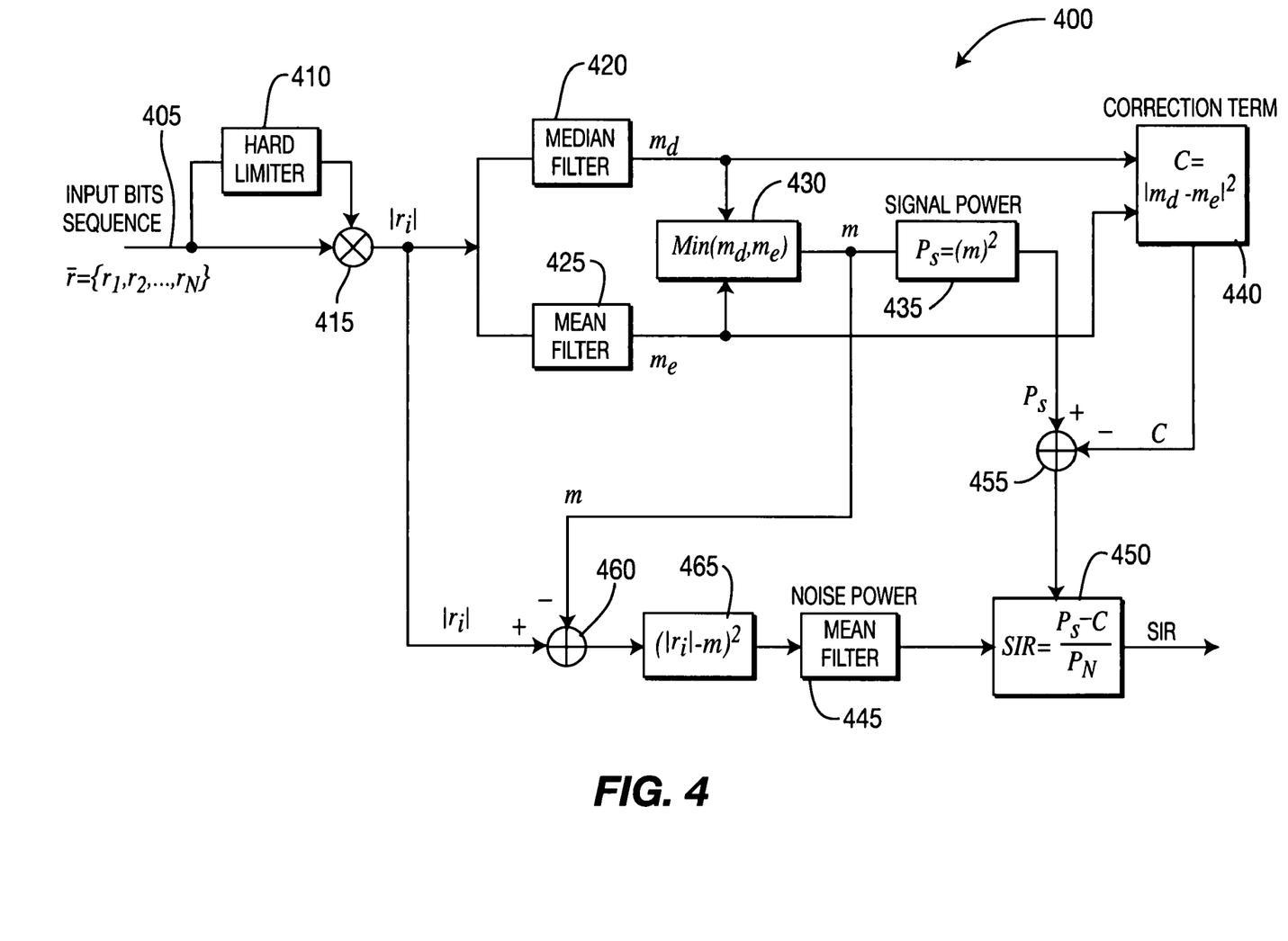
FIG. 4 is an exemplary functional block diagram of a SIR estimator operating in accordance with a preferred embodiment of the present invention.

FIG. 4 shows a block diagram of a SIR estimator 400 taking input as data bits rather than QPSK symbols, in accordance with a preferred embodiment of the present invention. The SIR estimator includes an input port 405 for receiving an input bit sequence, a hard limiter 410, a multiplier 415, a median filter 420, a first mean filter 425, a minimizing process block 430, a signal power process block 435, a correction term process block 440, a second mean filter 445, a SIR calculating process block 450, summers/comparators 455, 460 and a process block 465.

Input port 405 receives a soft-valued bit sequence. The SIR estimator 400 processes absolute values of symbols input to the SIR estimator in the form of a bit sequence received via input port 405. The bit sequence is routed to the hard limiter 410 and the multiplier 415. The hard limiter 410 provides a +1 bit to multiplier 415 if a soft-valued bit is greater or equal to zero. Otherwise the hard limiter 410 provides a −1 bit to the multiplier 415. Multiplier 415 then multiplies each soft-valued input bit, $r_i$, by the corresponding hard limited bit, resulting in the absolute value $|r_i|$ of the individual input bit.

The absolute value $|r_i|$ indicates that a hard-bit decision on each input bit, $r_i$, has been made and if the resulting bit decision turns out to be −1, then the input bit is 180 degree phase shifted. Otherwise the input bit remains unchanged. Thus, the calculation of the average signal power and interference power is based on a blind based bit decision. The multiplier 415 outputs the absolute value $|r_i|$ to median filter 420, first mean filter 425 and summer/comparator 460. Based on a running number of samples, the median filter 420 and mean filter 425 determine the median value and mean value, respectively, of the absolute valued bit sequence. The outputs from the median filter 420 ($m_d$) and first mean filter 425 ($m_e$) are compared in the minimizing process block 430 to determine a minimum value m between the median based average power value $m_d$ and the mean based average power value $m_e$. The correction term process block 440 also receives the outputs from the median filter 420 ($m_d$) and mean filter 425 ($m_e$) and performs the following calculation to determine a correction term C:

$$C = |m_d - m_e|^2,$$

Equation (9)

where $$m_d = \frac{1}{4} \cdot \sum_{i=1}^{4} |\text{median}(y_k(Q_i))|$$

and $$m_e = \frac{1}{4} \cdot \sum_{i=1}^{4} |\text{mean}(y_k(Q_i))|,$$

$y_k$ is the k-th symbol in the sequence of symbols, $Q_i$ denotes the quadrants i of the QPSK constellation, and median($y_k(Q_i)$) and mean($y_k(Q_i)$) denote the median and mean values, respectively, of the symbols in the i-th quadrant $Q_i$.

The output m of minimizing process block 430 is routed to the signal power process block 435 and to summer/comparator 460. The summer/comparator 455 compares the output Ps of signal power process block 435 to the correction term C, where:

$$P_s = (m)^2 \quad \text{Equation (10)}$$

In order to determine the average interference power, the process block 465 first receives the output of summer/comparator 460 and performs the function $(|r_i|-m)^2$ which extracts the interference component out of the input bit sequence. The second mean filter 445 receives the output of process block 465 and outputs $P_N$ to the SIR calculating process block 450. The SIR is calculated by SIR calculating process block 450 based on the output from summer/comparator 455 and second mean filter 445, where:

$$SIR = \frac{P_s - C}{P_N} \quad \text{Equation (11)}$$

Figure 5:
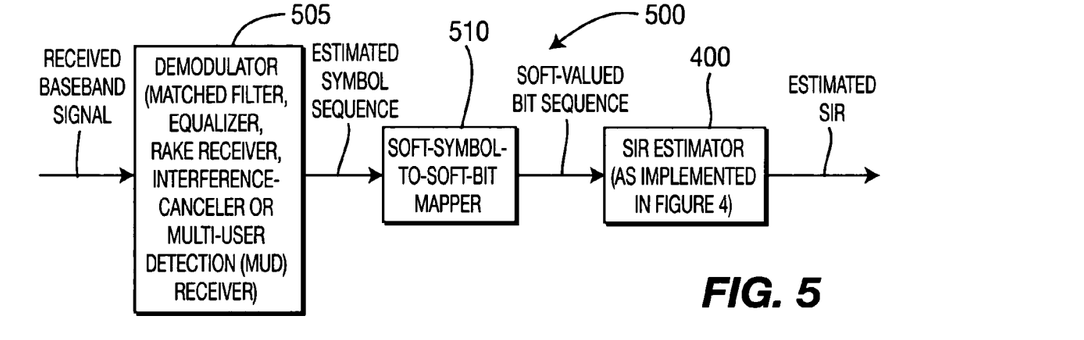
FIG. 5 is a system block diagram including the SIR estimator of FIG. 4.

FIG. 5 shows a system 500 which includes a demodulator 505 and a known soft-symbol-to-soft-bit mapper 510 which inputs a soft-valued bit sequence to the SIR estimator 400. The SIR estimator 400 may be used also for higher order modulations like 8-PSK, 16-QAM, and 64-QAM, if the complex valued demodulated symbols are converted to soft-valued bits via the soft-symbol-to-soft-bit mapper 510.

Figure 6:
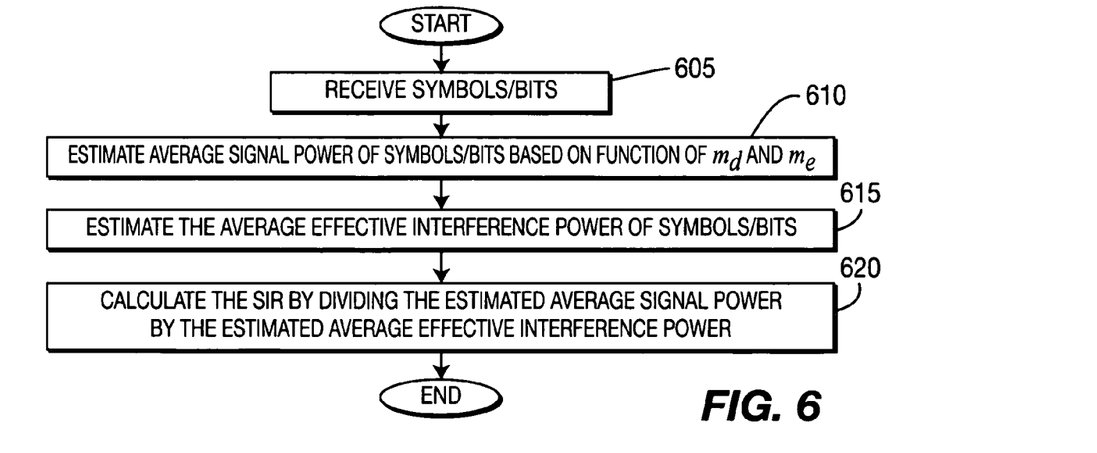
FIG. 6 is a flow chart of a process including method steps implemented by the SIR estimator of FIG. 4.

FIG. 6 is a flow chart of a process including method steps implemented by the SIR estimator 400. The SIR estimator estimates the SIR of symbols/bits by receiving the symbols/bits (step 605), estimating the average signal power of the symbols/bits as a function of a median based average power value $m_d$ and a mean based average power value $m_e$ of the symbols/bits for each quadrant of a QPSK constellation (step 610), estimating the average effective interference power of the symbols/bits (step 615) and calculating the SIR by dividing the estimated average signal power of the symbols/bits by the estimated average effective interference power of the symbols/bits (step 620). The function of the median based average power value $m_d$ and the mean based average power value $m_e$ is to provide a minimum value function for determining a minimum value m between the median based average power value $m_d$ and the mean based average power value $m_e$. The average signal power of the symbols/bits is equal to the magnitude squared of the minimum of the absolute value of the median based average power value $m_d$ and the absolute value of the mean based average power value $m_e$ averaged over all of the quadrants of the QPSK constellation.

The foregoing describes a novel SIR estimator based preferably on data symbols. Output of the data demodulator of interest, such as Rake output or MUD output, is fed to the SIR estimator. As indicated above, an advantage from using a data demodulator output as input is that the demodulator output best and directly reflects quality of received data signals. Especially when SIR measurement is used for link control techniques like power control, a data-demodulator based SIR measurement as described above is highly desirable. In addition, the proposed SIR estimator is capable of reducing bias effects on SIR estimation, resulting in more reliable and accurate SIR estimation than the prior art. All such modifications and variations are envisaged to be within the scope of the invention.

While the present invention has been described in terms of the preferred embodiment, other variations which are within the scope of the invention as outlined in the claims below will be apparent to those skilled in the art.

What is claimed is:

1. In a data demodulator that processes received baseband signals and provides soft-valued estimates of transmitted symbols, an estimator for estimating the average signal power of demodulated symbols as a function of a median based average power value $m_d$ and a mean based average power value $m_e$ of the demodulated symbols for each quadrant of a quadrature phase shift keying (QPSK) constellation, the estimator comprising:

an input for receiving the demodulated signals; and means for performing the following calculation to determine an average signal power estimate E of the demodulated symbols where:

$$E\{|S_k^d|^2\} = \left| \min\left( \left[\frac{1}{4} \cdot \sum_{i=1}^{4} |\text{median}(y_k(Q_i))|\right], \left[\frac{1}{4} \cdot \sum_{i=1}^{4} |\text{mean}(y_k(Q_i))|\right] \right) \right|^2$$

wherein $S_k^d$ is the k-th demodulated desired quadrature phase shift keying (QPSK) signal, $Y_k$ is the k-th demodulated symbol, $Q_i$ denotes the quadrants i of the QPSK constellation, median($Y_k(Q_i)$) and mean($y_k(Q_i)$) denote the median and mean values, respectively, of the demodulated symbols in the i-th quadrant $Q_i$, and min([median value], [mean value]) represents a minimum value function for determining a minimum value between the median and mean values, wherein the data demodulator processes received baseband signals and provides soft-valued estimates of transmitted symbols based on the average signal power estimate E of the demodulated symbols as determined by the performing means of the estimator.

2. The estimator of claim 1 wherein the function of the median based average power value and the mean based average power value is to provide a minimum value function for determining a minimum value m between the median based average power value $m_d$ and the mean based average power value $m_e$.

3. The estimator of claim 2 wherein the average signal power of the demodulated symbols is equal to the magnitude squared of the minimum of the absolute value of the median based average power value $m_d$ and the absolute value of the mean based average power value $m_e$ averaged over all of the quadrants of the QPSK constellation.

4. The estimator of claim 1 wherein the demodulated symbols are included in a burst of a dedicated physical channel (DPCH).

5. The estimator of claim 1 wherein the demodulated symbols are QPSK data symbols.

6. The estimator of claim 1 wherein the demodulated symbols are binary phase shift keying (BPSK) data symbols.

7. In a data demodulator that processes received baseband signals and provides soft-valued estimates of transmitted symbols, an estimator for estimating the effective interference power of demodulated symbols, the estimator comprising:

an input for receiving the demodulated signals; and means for performing the following calculation to determine the average effective interference power E of the demodulated symbols:

$$E\{|n_k^e|^2\} = \frac{1}{4}\left\{\sum_{i=1}^{4}\frac{1}{N_{Q_i}}\sum_{k=1}^{N_{Q_i}}\left|y_k(Q_i) - q_i \cdot \sqrt{E\{|s_k^d|^2\}}\right|^2\right\},$$

wherein $n_k^e$ denotes the total effective interference, $N_{Q_i}$ represents the number of the demodulator symbols belonging to the $i^{th}$ quadrant region after making blind based symbol decisions respectively, $Y_k(Q_i)$ is the k-th output symbol, which is in the $i^{th}$ quadrant, $\sqrt{E\{|S_k^d|^2\}}$ represents the average signal amplitude estimate and $q_i$, for i=1, 2, 3 and 4, respectively, represents the i-th QPSK constellation signal point denoted as follows:

$$q_1 = \frac{1+j}{\sqrt{2}}, q_2 = \frac{-1+j}{\sqrt{2}}, q_3 = \frac{-1-j}{\sqrt{2}}, q_4 = \frac{1-j}{\sqrt{2}},$$

where j is an imaginary number, wherein the data demodulator processes received baseband signals and provides soft-valued estimates of transmitted symbols based on the average effective interference power E of the demodulated symbols as determined by the performing means of the estimator.

8. The estimator of claim 7 wherein the demodulated symbols are included in a burst of a dedicated physical channel (DPCH).

9. The estimator of claim 7 wherein the demodulated symbols are QPSK data symbols.

10. The estimator of claim 7 wherein the demodulated symbols are binary phase shift keying (BPSK) data symbols.

* * * * *

UNITED STATES PATENT AND TRADEMARK OFFICE
CERTIFICATE OF CORRECTION

PATENT NO. : 7,254,496 B2
APPLICATION NO. : 11/430645
DATED : August 7, 2007
INVENTOR(S) : Shin et al.

It is certified that error appears in the above-identified patent and that said Letters Patent is hereby corrected as shown below:

At column 5, Equation 3, delete lines 2 & 3, and insert therefor

-- $E\left\{\left|S^d_k\right|^2\right\} \approx \left|1/4 \sum_{Q_i} E\{y_k | y_k \in Q_i\}\right|^2$ --.

At column 6, line 22, before the words "one of", delete "smallest" and insert therefor --smaller--.

At column 9, line 8, after the word "output", delete "Ps" and insert therefor --$P_s$--.

At claim 1, column 10, line 27, before the words "is the k-th", delete "$Y_k$" and insert therefor --$y_k$--.

At claim 1, column 10, line 29, after the word "median", delete "($Y_k(Q_i)$)" and insert therefor --($y_k(Q_i)$)--.

At claim 7, column 11, line 10, after the word "respectively", delete "($Y_k(Q_i)$)" and insert therefor --($y_k(Q_i)$)--.

Signed and Sealed this

Thirteenth Day of November, 2007

JON W. DUDAS
*Director of the United States Patent and Trademark Office*